United States Patent
Otsubo et al.

(10) Patent No.: US 6,879,824 B1
(45) Date of Patent: Apr. 12, 2005

(54) PORTABLE TELEPHONE DEVICE

(75) Inventors: Tetsuro Otsubo, Kanagawa (JP);
Kazunori Maekawa, Kanagawa (JP);
Shigeki Yokoi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 537 days.

(21) Appl. No.: 09/856,842

(22) PCT Filed: Sep. 13, 2000

(86) PCT No.: PCT/JP00/06269

§ 371 (c)(1),
(2), (4) Date: May 25, 2001

(87) PCT Pub. No.: WO01/24504

PCT Pub. Date: Apr. 5, 2001

(30) Foreign Application Priority Data

Sep. 28, 1999 (JP) .......................................... 11/274331

(51) Int. Cl.[7] .............................................. H01S 4/00
(52) U.S. Cl. .................................... 455/414.1; 370/228
(58) Field of Search ...................... 455/414.1; 370/228

(56) References Cited

U.S. PATENT DOCUMENTS

| | | | |
|---|---|---|---|
| 5,608,786 A | | 3/1997 | Gordon |
| 6,044,382 A | * | 3/2000 | Martino .................... 379/93.17 |
| 6,167,251 A | * | 12/2000 | Segal et al. ................. 455/406 |
| 6,367,693 B1 | * | 4/2002 | Novogrod .................... 235/379 |
| 6,496,477 B1 | * | 12/2002 | Perkins et al. ............... 370/228 |
| 6,667,968 B1 | * | 12/2003 | Tran .......................... 371/352 |

FOREIGN PATENT DOCUMENTS

| | | |
|---|---|---|
| CN | 1200609 | 12/1998 |
| DE | 198 04 563 A1 | 1/1999 |
| DE | 198 94 563 | 1/1999 |
| JP | 6-225296 | 8/1994 |
| JP | 6225296 | 8/1994 |
| JP | 09247293 | 9/1997 |
| JP | 9-247293 | 9/1997 |
| JP | 9247293 | 9/1997 |
| JP | 10 65653 | 3/1998 |
| JP | 10065853 | 3/1998 |
| JP | 10-112746 | 4/1998 |
| JP | 11-41669 | 2/1999 |
| JP | 11041669 | 2/1999 |
| JP | 11-88526 | 3/1999 |
| JP | 11088526 | 3/1999 |
| JP | 11-134166 | 5/1999 |
| JP | 11-249867 | 9/1999 |
| JP | 11249867 | 9/1999 |

* cited by examiner

Primary Examiner—Creighton Smith
(74) Attorney, Agent, or Firm—Pearne & Gordon LLP

(57) ABSTRACT

The invention aims at upgrading the operability of a portable telephone set by providing a linkage between the telephone function and the internet connection function.

The invention provides call connection request acceptance means and system control means in a portable telephone set equipped with internet information transmission/reception means and call means to make possible conversation via a call during internet connection; output means to facsimile and internet information storage means to allow internet information to be output to a facsimile; telephone number/e-mail address storage means to report an unanswered terminating call to a specified mail address; reading-off means to read off internet information as a voice; and timer means, image input means and voice input means to send audio, image and/or video information cyclically or on demand.

6 Claims, 3 Drawing Sheets

| NAME OF PERSON | ICHIRO YAMADA | JIRO TANAKA | SABURO SUZUKI |
|---|---|---|---|
| TELEPHONE NUMBER | 03-333-3333 | 04-222-2222 | 05-111-1111 |
| FACSIMILE NUMBER | 03-333-3366 | 04-222-2277 | 05-111-1188 |
| E-MAIL ADDRESS | yamada@kkk.jp | tanaka@aaa.jp | suzuki@bbb.jp |
| HOME PAGE ADDRESS | www.yamada.ac.jp | www.tanaka.ac.jp | www.suzuki.ac.jp |

PORTABLE TELEPHONE DEVICE

TECHNICAL FIELD

The present invention relates to a portable telephone set and in particular to a portable telephone set equipped with the internet connection function.

BACKGROUND OF THE INVENTION

A related art portable telephone set equipped with the internet connection function and/or facsimile function is known. An example of a portable telephone set equipped with the internet connection function and/or facsimile function will be explained below.

The "car navigation apparatus" disclosed in the Japanese Patent Publication No. 10-260047/(1998) is apparatus equipped with the internet-ready telephone function integrated with the car navigation function. The telephone set is composed of a car navigation system provided with a portable telephone set as communications apparatus, modem apparatus to allow data communications, an internet communication processor as a processor necessary to support the internet technology, a handset, and a remote controller. The telephone set has three functions, car navigation, portable telephone set and internet communications. The user can communicate with a distant party via the portable telephone function while checking the position of his/her car via the car navigation function.

The "portable telephone set equipped with the facsimile function" disclosed in the Japanese Patent Publication No. 10-112765/(1998) is a portable telephone set that ensures easy facsimile communications. In the dial information memory provided in the telephone set circuit, name information on a plurality of persons and corresponding home telephone numbers, portable telephone numbers, and facsimile numbers are registered. In the facsimile mode, the name information with the facsimile information registered is displayed on input display unit apart from the remaining name information.

The related art portable telephone set had a problem that the linkage between the internet connection function and the telephone function was not good thus resulting in poor operability for the user of a portable telephone set.

The invention has been proposed to solve the aforementioned problems with the related art and aims at providing a portable telephone set with easy operability by supporting a linkage between the telephone function and the internet connection function.

DISCLOSURE OF THE INVENTION

In order to solve the problems, a portable telephone set according to the invention comprises internet connection means, call means, call connection request acceptance means, and control means for starting a call by controlling the call means depending on signals from the call connection request acceptance means indicating call termination or call origination during internet connection. Via this configuration, it is possible to make conversation while referring to or sending internet information.

Preferably, a portable telephone set according to the invention comprises means for converting received internet information to a facsimile signal which is then output to an external component. Via this configuration, it is possible to output a printed image while referring to the internet information.

Preferably, a portable telephone set according to the invention comprises means for automatically originating to a prespecified mail address in case an incoming call is not answered. Via this configuration, it is possible to know the unanswered incoming call event via the internet.

Preferably, a portable telephone set according to the invention comprises means for notifying the mail address of a person that has attempted the unanswered call of another contact used in case the incoming call to the portable telephone set is not answered. Via this configuration, it is possible to send a mail that notifies the distant party of another contact in case a terminating call is not answered.

Preferably, a portable telephone set according to the invention comprises means for reading off internet information as a voice. Via this configuration, it is possible to hear the acquired internet information as a voice.

Preferably, a portable telephone set according to the invention comprises timer means, image input means, voice input means, and means for sending the information around the portable telephone set to the internet every specific interval. Via this configuration, it is possible to cyclically send information such as voices and images to the internet.

Preferably, a portable telephone set according to the invention comprises image input means, voice input means, and means for sending information around the portable telephone set to the internet according to a request from outside. Via this configuration, it is possible to send information such as voices and images to the internet in response to a request from outside.

Preferably, a portable telephone set according to the invention comprises means for sending another contact to the facsimile number of a person that has attempted the unanswered call, used in case a call is not answered by a portable telephone set. Via this configuration, it is possible to notify the distant party of an unanswered terminating call via facsimile.

In the figures, 1 represents internet information transmission/reception means, 2 call means, 3 call connection request acceptance means, 4 telephone number/e-mail address storage means, 5 system control means, 6 internet information display means, 7 output means to facsimile, 8 internet information storage means, 9 key input means, 10 a display, 11 reading-off means, 12 timer means, 13 image input means, and 14 voice input means.

BEST MODE FOR CARRYING OUT THE INVENTION

The embodiment of the invention will be detailed referring to FIGS. 1 through 4.

(Embodiment)

The embodiment of the invention is a portable telephone set that allows conversation while connected to the internet, reading-off or facsimile transmission of received internet information, transmission of image information and audio information around the portable telephone set to the internet, and notification of the mail address or facsimile number of the distant party of another contact, etc. in case a terminating call is not answered.

Figure 1:
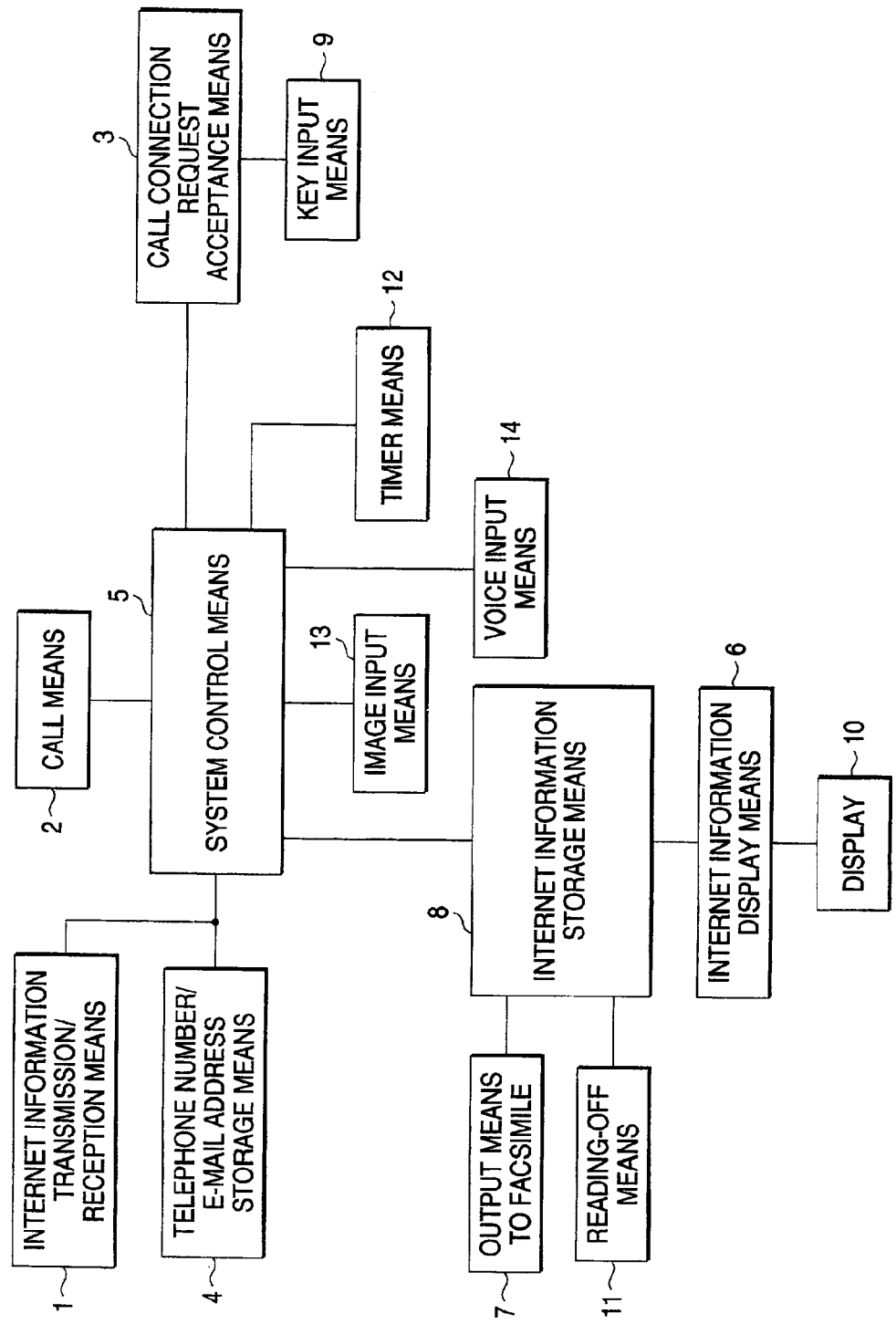
FIG. 1 is a block diagram showing the configuration of a portable telephone set according to the embodiment of the invention.

FIG. 1 is a functional block diagram of a portable telephone set according to the embodiment of the invention. In FIG. 1, internet information transmission/reception means 1 is means for transmitting/receiving internet information via suitable protocol such as TCP/IP protocol. Call means 2 is means for transmitting/receiving sound signals. Call connection request acceptance means 3 is means for accepting call origination requests or call termination requests. Telephone number/e-mail address storage means 4 is a memory as a directory mail address book. System control means 5 is means for performing centralized control of the entire system. Internet information display means 6 is apparatus for converting mail/home page data to display data. Output means to facsimile 7 is means for converting data to a facsimile signal and sending the facsimile signal. Internet information storage means 8 is a memory for storing received internet information. Key input means 9 is a keyboard for entering telephone numbers, etc. Display 10 is a display unit such as a liquid crystal display. Reading-off means 11 is means for converting text information to a sound signal. Timer means 12 is an interval timer for generating signals every specific interval. Image input means 13 is a still camera or a video camera. Voice input means 14 is a microphone.

Figures 2, 3:
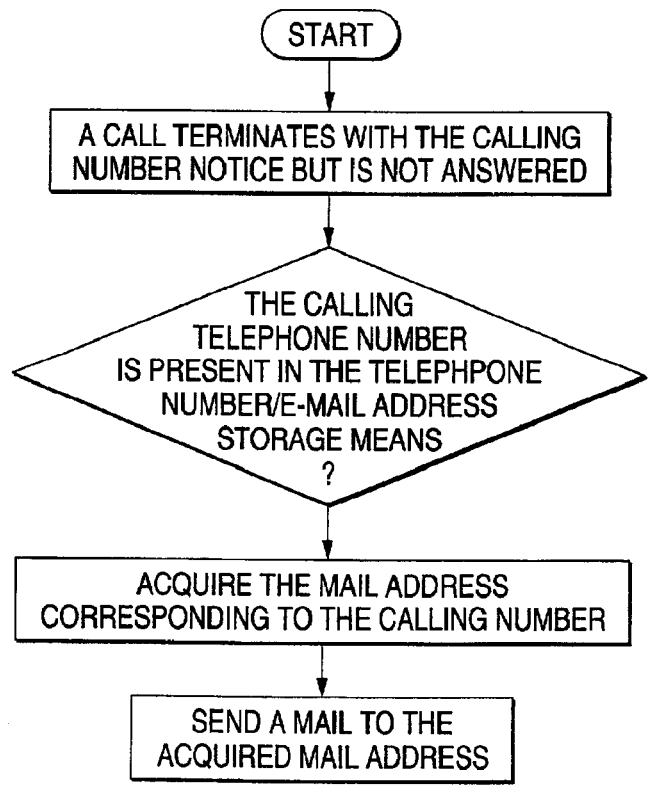
FIG. 2 shows an example of a directory in the portable telephone set according to the embodiment of the invention.
FIG. 3 is a flowchart explaining the mail sending operation triggered when a terminating call to a portable telephone set according to the embodiment of the invention is not answered.
Figure 4:
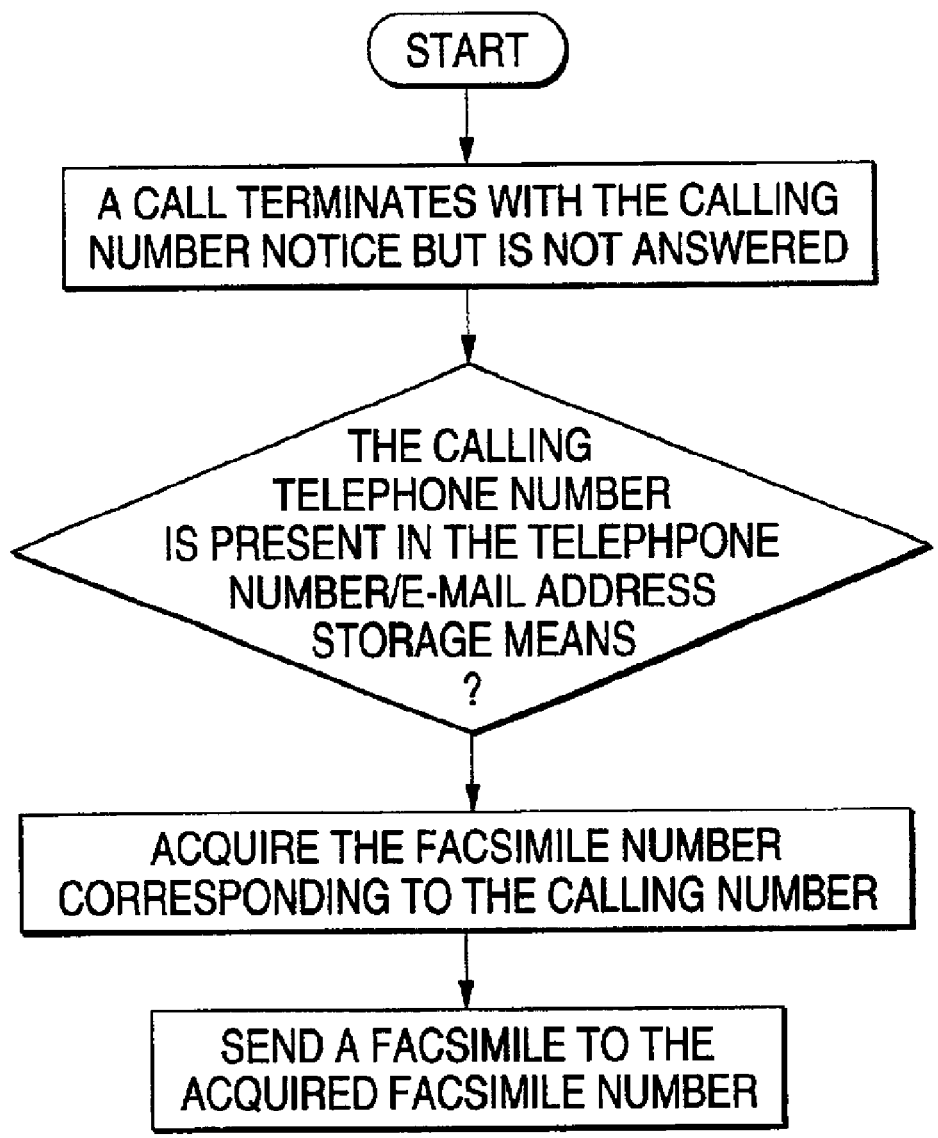
FIG. 4 is a flowchart explaining the facsimile sending operation triggered when a terminating call to a portable telephone set according to the embodiment of the invention is not answered.

FIG. 2 shows an example of a directory in the portable telephone set according to the embodiment of the invention. FIG. 3 is a flowchart explaining the mail sending operation triggered when a terminating call to a portable telephone set according to the embodiment of the invention is not answered. FIG. 4 is a flowchart explaining the facsimile sending operation triggered when a terminating call to a portable telephone set according to the embodiment of the invention is not answered.

Operation of the portable telephone set configured as mentioned earlier according to the embodiment of the invention will be explained. First, transmission/reception on internet information will be explained. Internet information is sent/received via the internet information transmission/reception means 1 in FIG. 1. The received information is stored in the internet information storage means 8 then displayed via the display 10. To browse internet information successively, the procedure is repeated. In case an incoming call terminates, the call connection request acceptance means 4 accepts the connection request. When the connection request is accepted, conversation starts by the call means 2 by way of the system control means 5. Thus, by performing internet communications while being engaged in a call, conversation referring to the internet information is allowed. Voice communications is allowed while referring to and updating internet information.

Next, operation of outputting internet information to a facsimile via the output means to facsimile 7. The internet information stored in the internet information storage means 8 is sent in a format that can be received by a facsimile via output means to facsimile 7. The facsimile format may be a standard output format that can be recognized by for example a G3 or G4 facsimile, etc. Alternatively, the format may be any means for outputting a printed image via a network. For example, the format may be output as a script and data for controlling a printer. The format may be output as a printed image on an ordinary printer. In nay case, by providing means for allowing output as a printed image, the user can output a printed image on the spot while browsing internet information, thereby considerably enhancing the operability.

In the third place, operation of converting the acquired internet information to voice data via the reading-off means 11 will be explained. Text information of the internet is output from the receiver or a speaker of a portable telephone set as a voice. For voice regeneration in a call, a voice to be sent to the distant part is also mixed as well as the receiving voice so that internet information can be provided to the distant party as audio information. It is thus possible to provide the distant party with internet information while conversation is in progress.

In the fourth place, operation of sending image information and audio information on a routine basis via the timer means 12, image input means 13 and the voice input means 14 will be explained. The timer means issues a information transmission request to the system control means every specific interval. Correspondingly, the system control means acquires the situation around the portable telephone set via the image input means and the voice input means, controls the internet information transmission/reception means and sends the information to a preset destination on the internet. Trigger for transmission of information may be for example drop of residual battery power of the portable telephone set or variation in field strength monitored by the portable telephone set and resulting constant level above predetermined value, as well as an interval-based request from the timer. In response to a request from outside, the situation around the portable telephone set is acquired via the image input means and the voice input means, which information is sent to a requesting distant party or a preset internet destination as image (still image and moving picture) information and audio information via the internet information transmission/reception means. A request from the outside may be any desired form. For example, a terminating call to the portable telephone set may be used as a trigger. Or reception of a message service or an e-mail may be used as a trigger.

In the fifth place, operation in response to an unanswered incoming call is explained. In case an incoming call to a portable telephone set is not answered by the user of the portable telephone set, the telephone number of the caller and the event of the unanswered call are sent to an e-mail address preset by the user of the portable telephone set. In case information corresponding to the calling number is present in the telephone number/e-mail address storage means 4, the information is also sent. Such information includes for example the name of a person, facsimile number, e-mail address and home page address. A function may be added whereby the sender information of the received message and text message contents are sent to an e-mail address preset by the user of the portable telephone set also when a text message service is received.

In the sixth place, operation via a mail in response to an unanswered incoming call is explained referring to FIGS. 2 and 3. In case the user of the portable telephone set does not answer the incoming call, the mail address of the person that attempted the unanswered call is identified based on the calling number notice of the originator of the unanswered call. Information in FIG. 2 is stored in the telephone number/e-mail address storage means in the portable telephone set. In case the number information of the distant party at call termination is 03-333-3333, the corresponding mail address yamada@kkk.jp is read, to which an e-mail is sent. The contents of the e-mail may be any message to the person that attempted call termination. For example, means for contact is reported such as the telephone number of another contact or mail address. While this example assumes operation in response to a first unanswered terminating call, mail transmission may be triggered when a preset number of unanswered terminating calls are placed. Setting so that information is sent via mails to callers having the highest priority to be reached alone can prevent transmission of unnecessary mails.

In the seventh place, operation via facsimile in response to an unanswered incoming call is explained referring to FIG. 4. In case the user of the portable telephone set does not answer the incoming call, the facsimile number of the person that attempted the unanswered call is identified based on the calling number notice of the originator of the unanswered call. Information in FIG. 2 is stored in the telephone number/e-mail address storage means in the portable telephone set. In case the number information of the distant party at call termination is 03-333-3333, the corresponding facsimile number 03-333-3366 is acquired, to which a facsimile message is sent. The contents of the facsimile may be any message to the person that attempted call termination. For example, means for contact is reported such as the telephone number of another contact or mail address. While this example assumes operation in response to a first unanswered terminating call, facsimile transmission may be triggered when a preset number of unanswered terminating calls are placed. Setting so that information is sent via facsimile to callers having the highest priority to be reached alone can prevent transmission of unnecessary facsimiles.

As mentioned earlier, the embodiment of the invention allows conversation while connected to the internet, reading-off or facsimile transmission of received internet information, transmission of image information and audio information around the portable telephone set to the internet, and notification of the mail address or facsimile number of the distant party of another contact, etc. in case a terminating call is not answered. This upgrades the operability of the portable telephone set equipped with the internet connection function.

INDUSTRIAL APPLICABILITY

As understood from the foregoing description, a portable telephone set according to the invention comprises internet connection means, call means, call connection request acceptance means, and control means for starting a call by controlling the call means depending on signals from the call connection request acceptance means indicating call termination or call origination during internet connection. This configuration has an advantage that it is possible to make conversation while referring to or sending internet information.

A portable telephone set according to the invention comprises means for converting received internet information to a facsimile signal which is then output to an external component. This configuration has an advantage that it is possible to know an unanswered terminating call via the internet.

A portable telephone set according to the invention comprises means for automatically originating to a prespecified mail address in case an incoming call is not answered. This configuration has an advantage that it is possible to know the unanswered incoming call event via the internet.

A portable telephone set according to the invention comprises means for notifying the mail address of a person that has attempted the unanswered call of another contact used in case the incoming call to the portable telephone set is not answered. This configuration has an advantage that it is possible to send a mail that notifies the distant party of another contact in case a terminating call is not answered.

A portable telephone set according to the invention comprises means for reading off internet information as a voice. This configuration has an advantage that it is possible to hear the acquired internet information as a voice.

A portable telephone set according to the invention comprises timer means, image input means, voice input means, and means for sending the information around the portable telephone set to the internet every specific interval. This configuration has an advantage that it is possible to cyclically send information such as voices and images to the internet.

A portable telephone set according to the invention comprises image input means, voice input means, and means for sending information around the portable telephone set to the internet according to a request from outside. This configuration has an advantage that it is possible to send information such as voices and images to the internet in response to a request from outside.

A portable telephone set according to the invention comprises means for sending via facsimile another contact used in case a call is not answered by a portable telephone set to the facsimile number of a person that has attempted the unanswered call. This configuration has an advantage that it is possible to notify the distant party of an unanswered terminating call via facsimile.

What is claimed is:

1. A portable telephone comprising:
   internet connection means for transmitting/receiving internet information;
   call means for transmitting/receiving sound signals;
   call connection request acceptance means for accepting call origination requests and call termination requests;
   control means for starting a call during an internet connection, wherein said control means controls said call means depending on signals from said call connection request acceptance means indicating call termination or call origination; and
   means for automatically sending information corresponding to an incoming call to a prespecified mail address when an the incoming call is not answered.

2. A portable telephone comprising:
   internet connection means for transmitting/receiving internet information;
   call means for transmitting/receiving sound signals;
   call connection request acceptance means for accepting call origination requests and call termination requests;
   control means for starting a call during an internet connection, wherein said control means controls said call means depending on signals from said call connection request acceptance means indicating call termination or call origination; and
   means for notifying a mail address of a caller of other contact information when a call from the caller to the portable telephone set is not answered.

3. A portable telephone comprising:

internet connection means for transmitting/receiving internet information;

call means for transmitting/receiving sound signals;

call connection request acceptance means for accenting call origination requests and call termination requests;

control means for starting a call during an internet connection, wherein said control means controls said call means depending on signals from said call connection request acceptance means indicating call termination or call origination; and means for converting text information to voice data, wherein voice data is output as audio.

4. A portable telephone comprising:

internet connection means for transmitting/receiving internet information;

call means for transmitting/receiving sound signals;

call connection request acceptance means for accepting call origination requests and call termination requests;

control means for starting a call during an internet connection, wherein said control means controls said call means depending on signals from said call connection request acceptance means indicating call termination or call origination;

timer means for generating a signal every specific interval, image input means, voice input means, wherein image and audio information is acquired around the portable telephone set by said image input means and said voice input means, and;

means for sending the information around the portable telephone set to the internet every specific interval.

5. A portable telephone comprising:

internet connection means for transmitting/receiving internet information;

call means for transmitting/receiving sound signals;

call connection request acceptance means for accepting call origination requests and call termination requests;

control means for starting a call during an internet connection, wherein said control means controls said call means depending on signals from said call connection request acceptance means indicating call termination or call origination;

image input means, voice input means, wherein image and audio information is acquired around the portable telephone set by said image input means and said voice input means, and;

means for sending the information around the portable telephone set to the internet according to a request from a trigger signal.

6. A portable telephone comprising:

internet connection means for transmitting/receiving internet information;

call means for transmitting/receiving sound signals;

call connection request acceptance means for accepting call origination requests and call termination requests;

control means for starting a call during an internet connection, wherein said control means controls said call means depending on signals from said call connection request acceptance means indicating call termination or call origination; and means for notifying a facsimile number of a caller of other contact information when a call from the caller is not answered by the portable telephone set.

\* \* \* \* \*